United States Patent [19]
Farelli

[11] 3,899,004
[45] Aug. 12, 1975

[54] CYLINDRICAL TUBULAR UNION PROVIDED WITH AN INTEGRAL PRESSING FORMED THREAD FOR THE ENGAGEMENT WITH A SCREW CAP

[76] Inventor: Mario Farelli, C.50 Giulio Cesare 298, Turin, Italy

[22] Filed: July 16, 1973

[21] Appl. No.: 379,797

[30] Foreign Application Priority Data
July 26, 1972 Italy.................................. 69431/72

[52] U.S. Cl.................................... 138/89; 285/391
[51] Int. Cl.² ......................................... F16L 55/10
[58] Field of Search........... 138/89, 96 R; 220/40 R, 220/24 C, 24 GT, 254, 256, 290; 285/391, 390, 408, 385

[56] References Cited
UNITED STATES PATENTS

| | | | |
|---|---|---|---|
| 455,539 | 7/1891 | Bayles................................. | 285/391 |
| 1,960,354 | 5/1934 | Snell .................................. | 220/24 C |
| 2,181,969 | 12/1939 | Eshbaugh........................... | 220/24 C |
| 2,702,565 | 2/1955 | Moritz et al. ...................... | 138/89 X |

*Primary Examiner*—Richard C. Queisser
*Assistant Examiner*—Daniel M. Yasich

[57] ABSTRACT

A tubular pipe union comprising a collar which is drawn to form a radial flange substantially U-shaped in cross-section which is interrupted by a peripheral radial cut to allow press forming of a screw thread.

1 Claim, 8 Drawing Figures

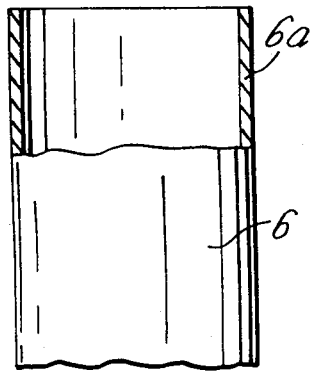
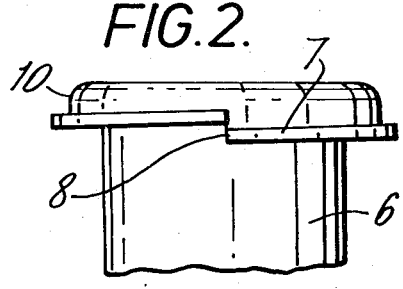
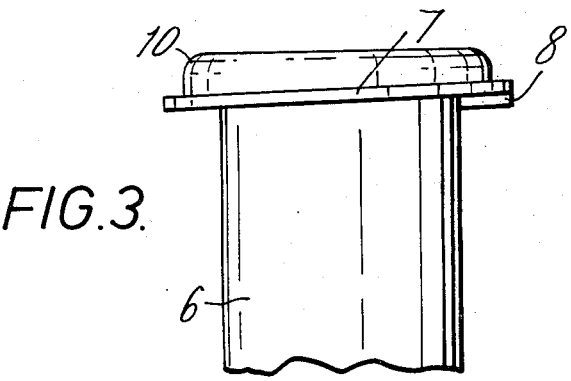
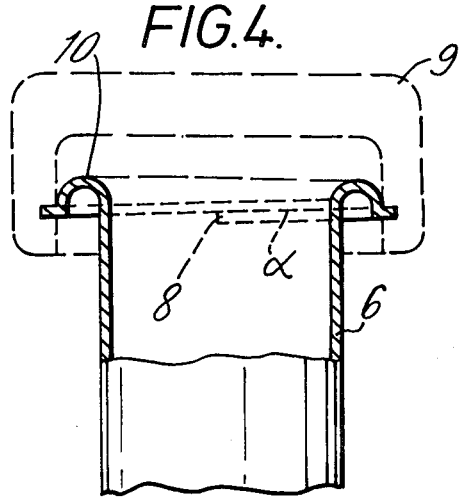
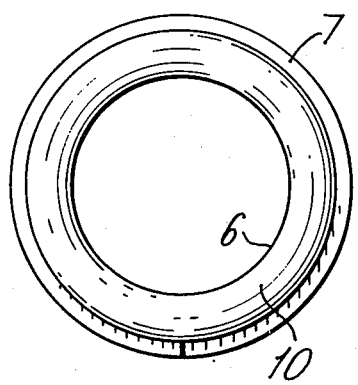

CYLINDRICAL TUBULAR UNION PROVIDED WITH AN INTEGRAL PRESSING FORMED THREAD FOR THE ENGAGEMENT WITH A SCREW CAP

The present invention relates to pipe unions, in general, which are closed by removable screw covers or caps.

Particularly, but not exclusively, the invention concerns filler unions for fuel tanks or radiators of motor vehicles.

As known, said unions comprise a metal ring having a threaded skirt and welded to the tubular edge of a duct branch, which engages a cap having a threaded inner edge.

The metal ring threading and welding operations increase the cost of the pipe union. Further, in the cases where, for particular uses, the duct end is submitted to high temperature, the metal ring can not be soft soldered to the end of the tubular duct.

In order to eliminate the above said drawbacks and to provide a union with a screw cap or cover for duct terminals in general, particularly for filler unions of fuel tanks and radiators for motor vehicles, the present invention provides a cylindrical pipe union characterized in that its end edge is drawn to form a protruding flange with a helicoidal shape forming at least one turn of screw thread, suitable to engage the inner edge of a corresponding cover or cap which is also threaded.

According to a variant, a pressed collar provided with a flange which is, helicoidally shaped and forms a screw thread suitable to engage a cover with a threaded cylindrical inner edge, is inserted and fixedly locked at the tope end of the duct.

Particular features of the invention will appear from the following specification referred to with the drawing annexed only as a demonstrative and non-limiting example, wherein:

FIG. 1 illustrates the cylindrical tubular end of a duct branch on which the pipe union is to be provided;

FIG. 2 shows the same end having been drawn according to the present invention;

FIG. 3 is another view of the pipe union as viewed rotated through 90° with respect to FIG. 2;

FIG. 4 is a longitudinal section of the union pipe;

FIG. 5 is a top view of the same;

Figure 6:
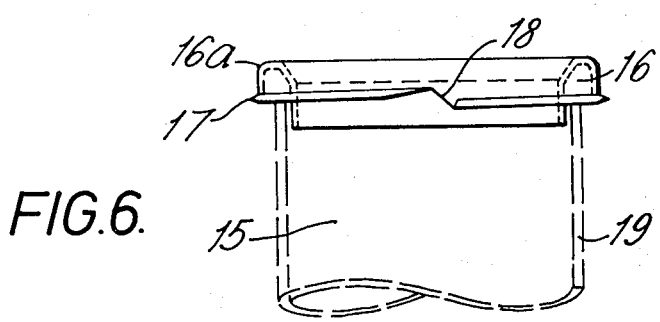
FIG. 6 is a side view of a variant showing a collar with a helicoidal flange.

With reference to the drawing, FIGS. 1 to 5, number 6 indicates the tubular end of a, preferably, metal duct branch connected to a tank or radiator which must be closed by a screw cap. By a single pressing operation, the terminal edge 6a of said end is drawn so as to form the flange 7 radially protruding and helicoidally shaped. The short radial cut 8 allows the helical orientation of flange 7 and constitutes further the beginning of a single start screw thread suitable to engage, by screwing, the corresponding nut, not shown, provided in the inner edge of a cover or cap 9, indicated by dotted line on FIG. 4.

The convex edge 10, protruding with respect to the flange 7 plane is formed in order to provide a perfectly plane ledge with respect to the bottom of the cap, or cover 9 and, in the same time to form a sturdy stiffening bead which prevents any deformation of the thread of flange 7 even if the cap or cover 9 is tightened at bottom on the same.

The advantages deriving from the use of said pipe union may be summarized thusly:

— the means for the engagement by screwing of the closure cap or cover, are made in a single body with the tubular section to be closed and therefore they are not separable from the same, even if the pipe union undergoes violent impacts. This is very important in that, if the pipe union is a part of a fuel tank of a motor vehicle which, due to an accident, is directly knocked, the threaded ring remains united with the pipe end, thereby retaining the cap and so the danger of a fire, due to spillage of fuel, is avoided.

— the operations to form the screwing seat for the cap are speedy and simple and therefore the cost of the pipe union is remarkably reduced.

Figure 7:
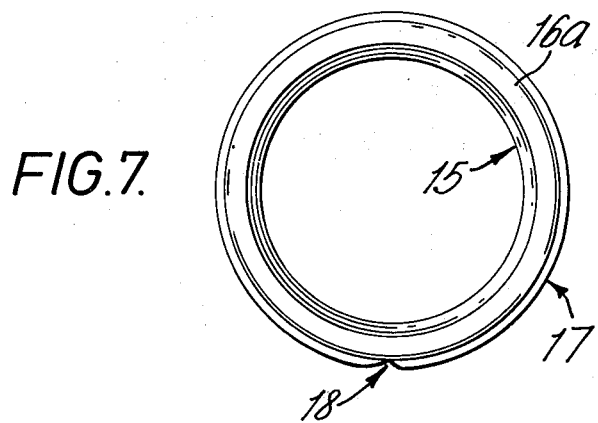
FIG. 7 is a top view of the same.
Figure 8:
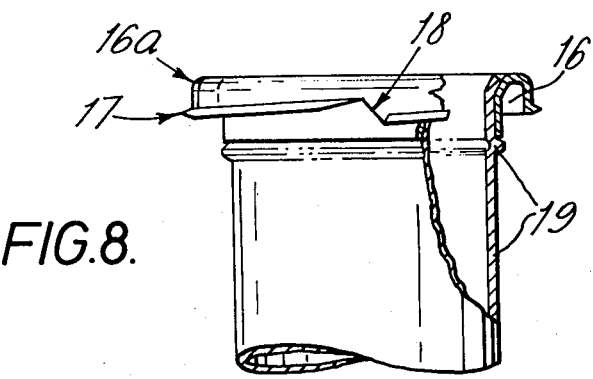
FIG. 8 is similar to FIG. 1 and shows a partial section of the pipe union.

According to a variant and with reference to FIGS. 6 to 8, starting from a cylindrical tubular element, preferably made of metal sheet, a suitable press drawing operation forms the turn-over edge 16 and the perimetrical flange 17, which with respect to the axis of element 15, has a helicoidal shape interrupted at 18.

The so obtained collar may be applied at the top of a duct branch 19 by fixed-joint of the cylindrical edge of element 15 within the tubular element 19 (FIG. 6), or vice versa, by fixed-joint of the element (FIG. 8) within the collar 15.

The pipe union is then locked in seat by means of suitable weldings.

As represented on the drawing, the outline conferred to edge 16 is such as to present a crown 16a which forms a plane edge against which the gasket carried by the screw cap, engaging thread of flange 17, makes a tight closure.

I claim:

1. A tubular type union for automotive radiators comprising, a duct branch having one end connected to a radiator, a collar fixedly secured to the other end of said duct branch and adapted to engage a gasketed screw cap having a threaded inner surface, a U-shaped crown formed on said collar for sealingly engaging the gasket of said screw cap, an outwardly extending helicoidal flange disposed on the periphery of the end of the outer leg of said U-shaped crown, and an interrupted section formed in said helicoidal flange which forms a screw thread adapted for engagement with said threaded inner surface of said cap.

* * * * *